(12) United States Patent
Wang

(10) Patent No.: US 9,128,757 B2
(45) Date of Patent: Sep. 8, 2015

(54) METHOD AND LIGHTWEIGHT MECHANISM FOR MIXED-CRITICAL APPLICATIONS

(71) Applicant: GM GLOBAL TECHNOLOGY OPERATIONS LLC, Detroit, MI (US)

(72) Inventor: Shige Wang, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/158,581

(22) Filed: Jan. 17, 2014

(65) Prior Publication Data

US 2015/0205635 A1 Jul. 23, 2015

(51) Int. Cl.
*G06F 7/00* (2006.01)
*H04J 3/24* (2006.01)
*G06F 9/48* (2006.01)

(52) U.S. Cl.
CPC .................................. *G06F 9/4881* (2013.01)

(58) Field of Classification Search
CPC ........... G06F 9/00; G06F 12/00; G06F 12/14; G06F 11/00; G06F 3/1296; G06T 1/00; G06T 1/20; G06T 2207/10061; G06T 2207/30148; G06T 7/0004; H04L 5/0058; H04L 12/5693; H04L 2012/5658; H04L 47/6285; H04N 1/32128; H04N 1/32561; H04N 2201/0094; H04N 2201/3216
USPC .................... 701/36, 400–541; 340/988–996; 370/474, 535
See application file for complete search history.

(56) References Cited

U.S. PATENT DOCUMENTS

| | | |
|---|---|---|
| 6,189,022 B1 | 2/2001 | Binns |
| 2002/0073129 A1* | 6/2002 | Wang et al. ................... 709/102 |
| 2004/0054831 A1* | 3/2004 | Johansson ..................... 710/200 |
| 2005/0076266 A1* | 4/2005 | Costin ............................ 714/38 |
| 2014/0126412 A1* | 5/2014 | Murakami et al. ............ 370/252 |

FOREIGN PATENT DOCUMENTS

| | | | |
|---|---|---|---|
| JP | 2003-006172 | * | 1/2003 |
| JP | 2003-006172 A | * | 1/2003 |

OTHER PUBLICATIONS

Birk, A. "Efficient Scheduling of Behavior-processes on Different Time-Scales" Robotics and Automation, ICRA. IEEE International Conference, vol. 1, 2001, pp. 299-304.

(Continued)

*Primary Examiner* — Muhammad Shafi
(74) *Attorney, Agent, or Firm* — John A. Miller; Miller IP Group, PLC

(57) ABSTRACT

A system and method for scheduling the execution of multiple mixed-criticality software applications on the same processor. The method separates higher critical, but lower operational rate, software applications into multiple segments so that the separated segments cause the lower rate applications to have a higher rate so that they operate before the lower critical software applications. Alternately, the method increases the length of a lower critical, but higher frequency, software application so that the software application has a lower frequency than the more critical application so that the more critical application has a higher priority.

14 Claims, 3 Drawing Sheets

(56) References Cited

OTHER PUBLICATIONS

Mercer,Clifford W. "Processor Capacity Reserves for Multimedia Operating Systems" School of Computer Science, Carnegie Mellon University, Pittsburgh, PA supported by National Science Foundation Graduate Fellowship and U.S. Naval Ocean Systems Center under contract No. N00014-91-J-4061, May 1993, pp. 1-15.

Silcock,Jackie "Taxonomy of Real-Time Scheduling" CiteSeerX web page http://citeseerx.ist.psu.edu/viewdoc/summary?doi=10.1.1.45.1345 (Oct. 4, 2013).

* cited by examiner

METHOD AND LIGHTWEIGHT MECHANISM FOR MIXED-CRITICAL APPLICATIONS

BACKGROUND OF THE INVENTION

1. Field of the Invention

This invention relates generally to a system and method for scheduling mixed-critical software applications on a common processor and, more particularly, to a system and method for scheduling harmonic mixed-critical software applications on a common processor, where application priority is based on execution frequency, and where higher critical applications having lower execution frequencies are divided into multiple segments to increase their execution frequency and priority, or lower critical applications having higher execution frequencies are lengthened to decrease their execution frequency and priority.

2. Discussion of the Related Art

Modern vehicles employ various embedded electronic controllers that improve the performance, comfort, safety, etc. of the vehicle. Such controllers include engine controllers, suspension controllers, steering controllers, power train controllers, climate control controllers, infotainment system controllers, chassis system controllers, etc. These controllers typically require special purpose software and algorithms to perform their control functions.

The current trend for vehicle electronic controllers is to provide multiple software applications for different functions operating on a common controller. For example, adaptive cruise control (ACC) systems, lane centering systems, lane keeping systems, stability control systems, etc. are all known in the art all of which automatically control vehicle steering and/or braking in some fashion. These systems often times employ the same sensor inputs and other variables, sometimes referred to as global variables, that when stored in memory can be used by more than one software application. For example, the ACC system may write sensor data into the controller memory during its operation on the processor, and the lane centering system may write that data into its software when it is running on the processor. Thus, it makes sense in many cases such as these to run multiple software applications on the same processor.

Providing multiple related software applications running on a common controller has obvious advantages for reducing system hardware and cost. However, operating different software applications on the same processor increases the complexity of the controller because of the scheduling required to run the different software applications and prevent the software applications from interfering with each other. Such mixed use applications operating on a single processor is further increased in complexity when a vehicle OEM provides additional software on a controller already having software provided by a supplier.

In most cases, the various software applications operating on a single processor will have mixed criticality, i.e., the applications will have higher or lower levels of importance relative to each other to provide safety, convenience, etc. For these types of systems, the scheduling algorithm that schedules the execution of each software application may interleave the operation of the applications together, where part of one software application runs, but may not finish, and stops so another application can run on the processor.

A scheduler for a processor operating mixed-criticality software applications will typically give the software application having the highest execution frequency or period, which means it executes the most often, the highest priority. Particularly, schedulers in mixed application shared resource systems base their priority on frequency of operation because that technique is the most commonly used scheduling technique to ensure that all of the applications will completely execute before the start time for their next execution run. Because scheduling priority is assigned based on execution frequency, a higher critical application, but with a lower priority, will be preempted by a lower critical application, but with a higher priority, when their execution interferes in time, sometimes referred to as a criticality inversion problem. More particularly, even though the highest frequency software application may not be the most critical application, current software schedulers would allow the software application having the fastest execution frequency to take precedent over the more critical software application if both applications were scheduled to run at the same time. For example, a particular software application operating on the processor may be required to operate very quickly in order to satisfy its particular function, where that function may not be overly important or critical. A more critical software application, such as a stability control algorithm, may only need to operate at a slower rate.

Various techniques are known in the art to effectively allow mixed-criticality software application to run on a single processor so that the more critical lower priority software applications are not preempted by less critical higher priority software applications. One known technique is referred to as dual priority scheduling (DPS) where each application running on the processor is assigned two priorities, where one priority is determined by how critical the software application is and the other priority is determined by how often the software application needs to be executed. Based on this, there are two execution modes at run time, namely, the normal execution mode based on the rate and the overload execution mode based on criticality. However, DPS has a number of drawbacks, including a very high run time overhead. In another known technique, referred to as zero-slack rate monotonic (ZSRM), each application has execution times for normal operation and overload operation. The scheduling is computed with the latest start time of a critical application to finish its overload computation. However, ZSRM requires different execution times which may lead to many scheduling variations requiring high cost for test and validation.

SUMMARY OF THE INVENTION

The following disclosure describes a system and method for scheduling the execution of multiple mixed-criticality software applications on the same processor. The method separates higher critical, but lower operational rate, software applications into multiple segments so that the separated segments cause the lower rate applications to have a higher rate so that they operate before the lower critical software applications. Alternately, the method increases the length of a lower critical, but higher frequency, software application so that the software application has a lower frequency than the more critical application so that the more critical application has a higher priority.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for scheduling mixed-criticality software applications on a common processor is merely exemplary in nature, and is in no way intended to limit the invention or its applications or uses.

Figure 1:
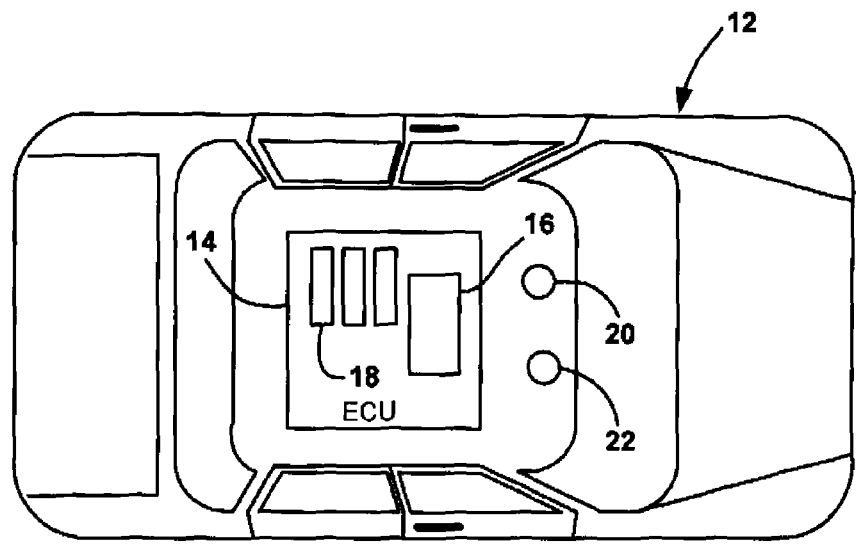
FIG. 1 is an illustration of a vehicle including an electronic control unit (ECU) having a single processor operating multiple mixed-criticality software applications.

FIG. 1 is an illustration of a vehicle 12 including an electronic control unit (ECU) 14 having shared hardware 16 and running a number of mixed-criticality software applications 18. The shared hardware 16 includes a processor, memory, input/output devices, communications links, etc. and the software applications 18 may include data, functions, etc. The vehicle 12 may include many such ECUs that control different operations of the vehicle 12 and may receive data from multiple sources, such as sensors and detectors 20 and 22, representing any type of suitable sensing device on the vehicle 12.

Figure 2:
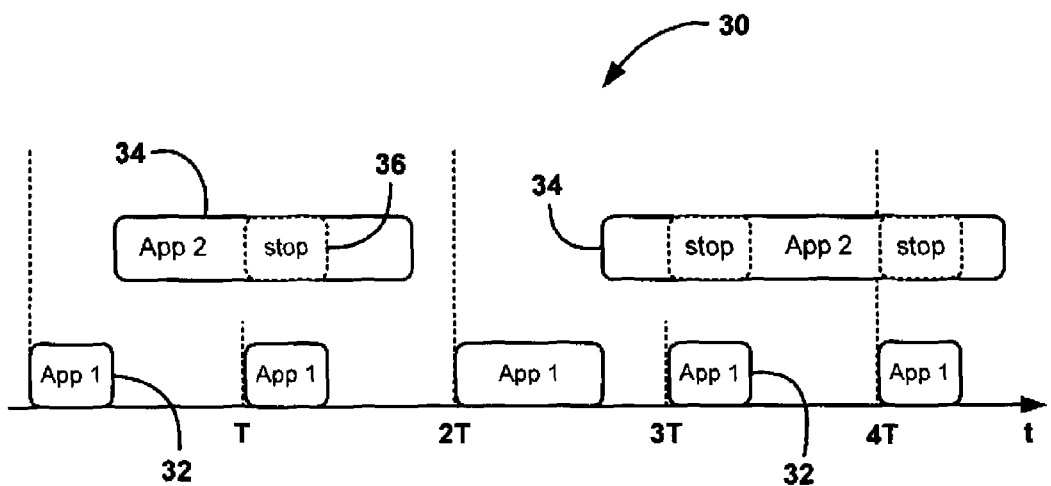
FIG. 2 is an illustration of a time line showing multiple mixed-criticality software applications operating on a common controller.

FIG. 2 is an illustration of a time line 30 showing the criticality inversion problem referred to above, where the time line 30 defines time intervals T, 2T, 3T and 4T. The illustration 30 shows two software applications, where one application is represented by blocks 32 on a lower line and the other application is represented by blocks 34 on an upper line, and where the software applications 32 and 34 are operating on a common processor. Each of the blocks 32 and 34 represents one complete execution of the software applications. As shown, the software application 32 executes every period T and the software application 34 executes every period 2T.

Software application execution rates are set at predetermined intervals, such as 2.5 ms, 5 ms, 10 ms, 20 ms, 40 ms, etc., where the time it takes the application to execute is less than the next execution interval for that rate. Each execution time at each interval is referred to herein as an invocation. Because the software application 32 has a higher execution frequency, it is given a higher priority in the scheduling process. Because the software application 32 has a higher priority, its second invocation at time T will prevent the software application 34 from running on the processor during the time that the application 32 is running, represented by dotted box 36. After the higher priority software application 32 has finished running, then the lower priority software application 34 will resume, but because of its importance or criticality problems may occur when it is not running. Additionally, the third invocation of the application 32 at time 2T may experience an execution time variance because of other system activity, such as cache miss, pipeline stall, etc., and takes longer to complete, as shown. For the second invocation of the application 34 at time 2T, because the higher priority software application 32 preempts the operation of the software application 34, the execution of the software application 34 extends beyond time 4T, which interferes with its next execution time thereafter.

The present invention proposes employing period transformation for selected software applications operating on a shared processor to change the execution frequency or execution rate of a particular software application to change its priority. Period transformation can be accomplished in two ways, namely, a reduction process where a particular software application is divided into segments to increase its execution frequency or extension where a particular software application is lengthened to decrease its execution frequency. For period transformation reduction, those software applications that have higher criticality, but lower execution frequency, and are harmonic, i.e., run at a fixed rate, are separated into two or more segments so that the entire software application is not executed all at once, but the separation of the application into segments causes its period or rate to be increased so that it has a higher execution frequency and thus a higher priority. In order to accomplish this, each application needs to be composed of multiple functions that can be executed with tolerances having a certain amount of time delays.

In one embodiment, the application scheduler includes a predetermined number of priority slots that cause software applications having the same priority, i.e., the same execution frequency, to be executed in a predetermined order. In other words, each application execution frequency, such as 2.5 ms, 5 ms, 10 ms, etc., has its own task scheduler defining a predetermined number of slots in descending order of application execution, where the higher criticality applications can be placed higher in the slot order so that they execute earlier. Therefore, by placing a higher criticality software application having the same frequency as a lower criticality software application higher up in the slot order on the scheduler, the higher criticality applications can be executed first. The particular software application that is divided up into segments can be divided into any number of segments that allow the functions to be separated as long as the application remains harmonic, and is completed before the execution time for the next run of that software application.

At run time, the controller maintains a variable to track the invocation for each transformed task. A bit-shift operation can be used to reduce RAM overhead. For example, if a 50 ms software application task has the same criticality as a 12.5 ms software application task, the 50 ms task can be split into four segments so that both tasks have the same criticality, which allows their priority to be selected as discussed above. The size of each segment of the particular application is determined in a way so that no invocation violates the scheduling ability of the system. For the task level, the process allocates which function executes in which invocation. For example, a function execute process for a bit sequence of 1,0,0,0 means that the entire application or segment is executed in the first 12.5 ms invocation and none in the second, third and fourth invocation, and an execution bit sequence of 1,0,1,0 means that the first segment of the task is executed in the first invocation and the second segment of the task is executed in the third invocation.

Figure 3:
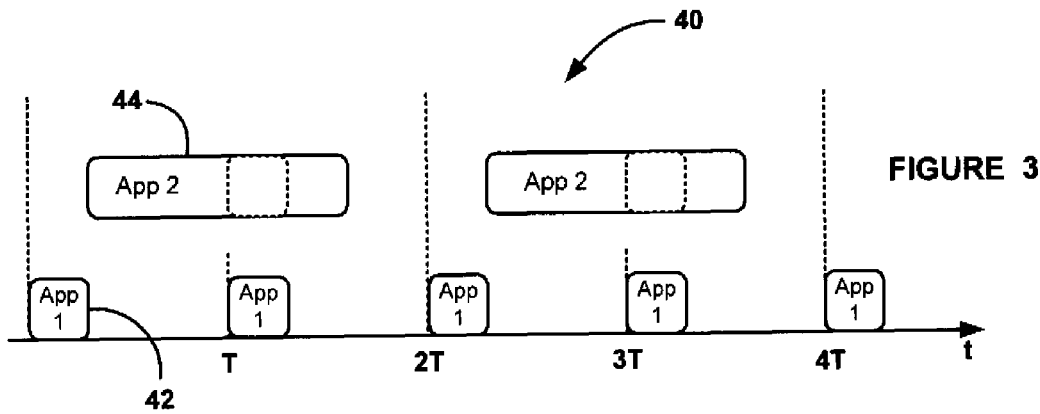
FIG. 3 is an illustration of a time line showing a low-criticality, high execution frequency software application and a high-criticality low execution frequency software application.
Figure 4:
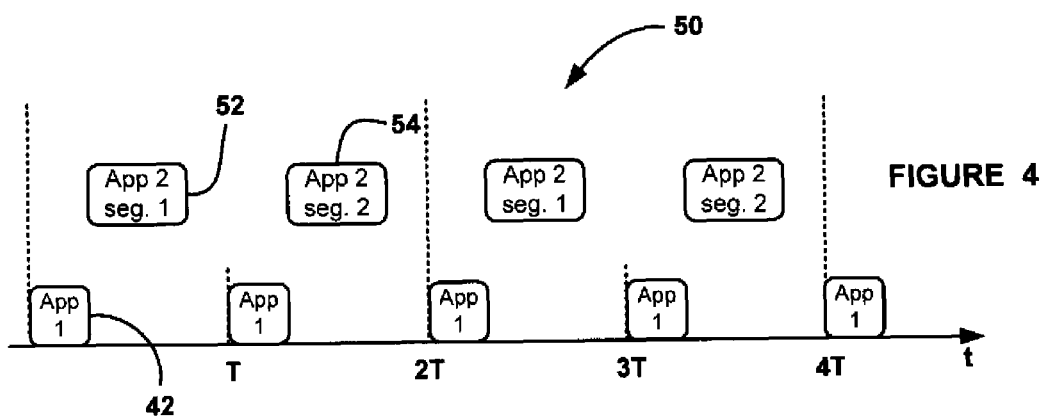
FIG. 4 is a time line illustrating the high-criticality software application shown in FIG. 3 being segmented to have the same execution rate as the low-criticality software application.
Figure 5:
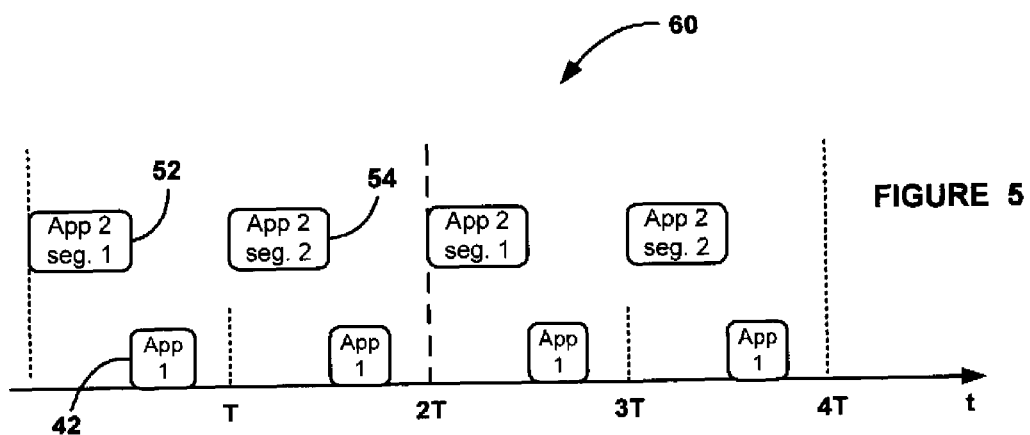
FIG. 5 is a time line illustrating when the low-criticality software application shown in FIG. 4 will execute.

The technique described above for period transformation reduction is illustrated in FIGS. 3-5 showing time lines 40, 50 and 60, respectively. In the time line 40, a lower criticality software application represented by blocks 42 has a rate where it runs once every time period T and a higher criticality software application represented by blocks 44 has a rate where it executes once every time period 2T. As discussed above, the software application 42 will have a higher priority and will preempt execution of the software application 44 if their executions interfere in time. The time line 50 shows the period transformation reduction where the software application 44 is divided into two segments represented by blocks 52 and 54, where the entire software application in the block 44 is included in the combined blocks 52 and 54. Now the software applications 42 and 44 have the same frequency, i.e., each execute once every time period T, and the same priority. The time line 50 still shows the application 42 operating first, which may cause criticality problems if the lower criticality application 42 has a longer execution, which may violate the timing of the higher criticality application 44.

Since the applications 42 and 44 have the same priority, the scheduler can schedule the application 44 first, as shown by the time line 60, so that the application 44 will complete its execution regardless of execution variations of itself and lower critical application. Particularly, the application scheduler for that frequency can execute the higher criticality software application 44 first as set by its location in the scheduling slots. Since the software application 44 operates first, the software application 42 is prevented from executing until the first segment 52 of the application 44 is executed, as illustrated in the time line 60. The lower criticality application 42 may experience violations of its timing constraint if any segment of the higher criticality application 44 or itself has a long execution time, which may be acceptable because of its low criticality. It is noted that although the segments 52 and 54 have the same length this by way of non-limiting example in that the segments can have different lengths.

Although the illustrations shown by FIGS. 3-5 divides the software application 44 into two segments so that it has the same frequency as the software application 42, in other embodiments, the software application 44 can be divided into any number of suitable segments as long as the software application 44 includes functions able to be separated. Thus, the frequency of the software application 44 can be greater than the software application 42 and be prioritized on a different scheduler than the software application 42.

For period transformation extension, the same basic process as discussed above is performed, but where the lower criticality higher execution rate software applications are lengthened in operation, such as by causing the application to run multiple times for each execution, so that they run less often, thus reducing their execution frequency.

Figure 6:
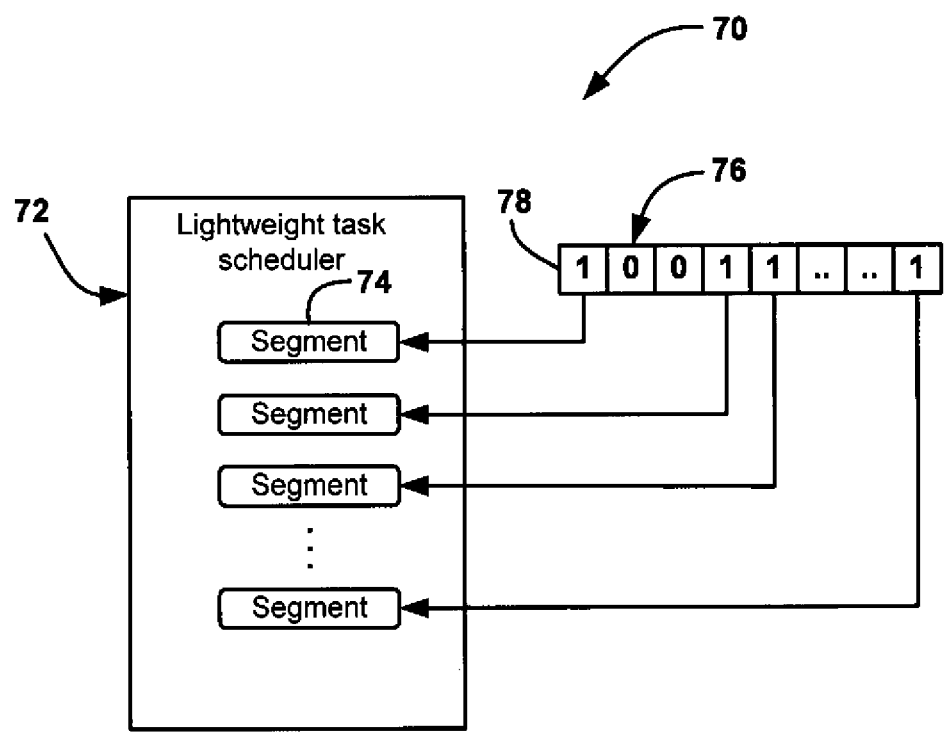
FIG. 6 is an illustration of a task structure for a certain invocation rate.

FIG. 6 is a block diagram of architecture 70 for a lightweight task scheduler 72 for a particular invocation rate, such as 2.5 ms, 5 ms, 10 ms, etc. The task scheduler 72 includes a number of slots arranged in descending order, where each slot is filled with a segment 74. The segments 74 represent a complete software application or a portion of a software application, where the location of the segment 74 in the scheduler 72 determines when it will be executed relative to the other segments 74. The time when the segments 74 are executed is controlled by a bit vector 76 including bits 78, where each bit 78 identifies an invocation, i.e., next time interval, at the particular execution rate. As the bit vector 76 is clocked in, a one bit 78 for the next invocation causes the next segment 74 to execute and a zero bit 78 for the next invocation does not allow the next segment 74 to execute. Controlling the execution of the segments 74 using the bit vector 76 reduces the controller memory requirements over known execution schedulers.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for scheduling execution of a plurality of mixed criticality software applications on a shared processor, said software applications and having a defined execution frequency, said method comprising:
   one or more electronic control units with shared hardware, said one or more electronic control units programmed for:
   determining the criticality of a first software application from the plurality of software applications;
   determining the criticality of a second software application from the plurality of software applications;
   determining that the criticality of the first software application is higher than the criticality of the second software application;
   determining that the execution frequency of the first software application is lower than the execution frequency of the second software application;
   employing period transformation to separate the first software application into a predetermined number of segments to increase the execution frequency of the first software application so that the execution frequency of the first software application is the same or greater than the execution frequency of the second software application; and
   executing the plurality of software applications including executing the segments at different times based on priority as determined by the execution frequency.

2. The method according to claim 1 wherein all of the segments have the same length.

3. The method according to claim 1 wherein at least two of the segments have different lengths.

4. The method according to claim 1 wherein all of the segments are executed within the same time period as the first software application before it was segmented.

5. The method according to claim 1 wherein executing the plurality of software applications includes assigning the software applications having the same execution frequency to a common task scheduler and prioritizing the execution of the software applications within the scheduler, where prioritizing the execution of the software applications includes prioritizing the segments.

6. The method according to claim 5 wherein executing the plurality of software applications includes providing a bit vector having a sequence of bits that controls when a software application or segment will execute, where a one bit causes a next priority application or segment to execute and a zero bit prevents a next priority application or segment from executing.

7. The method according to claim 1 wherein the plurality of software applications control vehicle functions.

8. A system for scheduling execution of a plurality of mixed criticality software applications on a shared processor, said software applications and having a defined execution frequency, said system comprising:
- one or more electronic control units with shared hardware, said one or more electronic control units programmed for:
- determining the criticality of a first software application from the plurality of software applications;
- determining the criticality of a second software application from the plurality of software applications;
- determining that the criticality of the first software application is higher than the criticality of the second software application;
- determining that the execution frequency of the first software application is lower than the execution frequency of the second software application;
- employing period transformation to separate the first software application into a predetermined number of segments to increase the execution frequency of the first software application so that the execution frequency of the first software application is the same or greater than the execution frequency of the second software application; and
- executing the plurality of software applications including executing the segments at different times based on priority as determined by the execution frequency.

9. The system according to claim 8 wherein all of the segments have the same length.

10. The system according to claim 8 wherein at least two of the segments have different lengths.

11. The system according to claim 8 wherein all of the segments are executed within the same time period as the first software application before it was segmented.

12. The system according to claim 8 wherein executing the plurality of software applications assigns the software applications having the same execution frequency to a common task scheduler and prioritizing the execution of the software applications within the scheduler, where prioritizing the execution of the software applications includes prioritizing the segments.

13. The system according to claim 12 wherein the executing the plurality of software applications provides a bit vector having a sequence of bits that controls when a software application or segment will execute, where a one bit causes a next priority application or segment to execute and a zero bit prevents a next priority application or segment from executing.

14. The system according to claim 8 wherein the plurality of software applications control vehicle functions.

* * * * *